(12) United States Patent
Gutierrez et al.

(10) Patent No.: US 7,477,400 B2
(45) Date of Patent: Jan. 13, 2009

(54) RANGE AND SPEED FINDER

(75) Inventors: Roman C. Gutierrez, Arcadia, CA (US); Tony K. Tang, Glendale, CA (US)

(73) Assignee: Siimpel Corporation, Arcadia, CA (US)

( * ) Notice: Subject to any disclaimer, the term of this patent is extended or adjusted under 35 U.S.C. 154(b) by 480 days.

(21) Appl. No.: 11/219,374

(22) Filed: Sep. 2, 2005

(65) Prior Publication Data

US 2007/0052841 A1  Mar. 8, 2007

(51) Int. Cl.
*G01B 11/24* (2006.01)
*G03B 3/00* (2006.01)
*G03B 17/00* (2006.01)

(52) U.S. Cl. .................. 356/609; 356/614; 356/624; 356/634; 356/4.04; 356/4.05; 396/89; 396/72

(58) Field of Classification Search .................. 356/219, 356/221, 224, 213, 609, 614, 624, 625, 3.05, 356/3.06, 3.12, 3.16, 4.01, 4.03, 11, 22, 28, 356/4.04; 348/374; 396/89, 72, 83, 111
See application file for complete search history.

(56) References Cited

U.S. PATENT DOCUMENTS

| | | | | |
|---|---|---|---|---|
| 4,647,193 A | * | 3/1987 | Rosenfeld | .................. 356/4.04 |
| 5,231,443 A | * | 7/1993 | Subbarao | ..................... 396/93 |
| 5,305,092 A | * | 4/1994 | Mimura et al. | ............... 356/609 |
| 5,381,236 A | * | 1/1995 | Morgan | ..................... 356/609 |
| 6,433,858 B1 | * | 8/2002 | Suzuki | ..................... 356/3.08 |
| 6,476,943 B1 | * | 11/2002 | Yertoprakhov | ............... 359/15 |
| 6,914,635 B2 | | 7/2005 | Ostergard | |
| 7,215,882 B2 | * | 5/2007 | Cho et al. | ..................... 396/89 |
| 7,280,149 B2 | * | 10/2007 | Weintroub et al. | .......... 348/349 |
| 7,400,415 B2 | * | 7/2008 | Patzwald | ..................... 356/614 |
| 2005/0088641 A1 | * | 4/2005 | Hung et al. | ................. 356/4.02 |

OTHER PUBLICATIONS

Akihiro Koga et al.; "Electrostatic Linear Microactuator Mechanism for Focusing a CCD Camera"; Journal of Lightwave Technology, vol. 17, No. 1; p. 43-47; Jan. 1999.

* cited by examiner

*Primary Examiner*—L. G Lauchman
(74) *Attorney, Agent, or Firm*—MacPherson Kwok Chen & Heid, LLP.; Don C. Lawrence

(57) ABSTRACT

A range/speed finder can be incorporated into a personal electronic device. In one example, a personal electronic device includes an automatic focus system adapted to focus an image of an object and a processor in communication with the automatic focus system adapted to detect a distance of the object using the automatic focus system. The processor can be adapted to detect a speed of the object and/or a dimension of the object using the automatic focus system. Methods and systems for determining a distance, a dimension, and/or a speed of the object relative to the personal electronic device are also provided.

20 Claims, 7 Drawing Sheets

RANGE AND SPEED FINDER

TECHNICAL FIELD

The present invention relates generally to range and speed detection and, more particularly, to personal electronic devices for measuring range and speed.

BACKGROUND

In recent years, the popularity of mobile telephones and other personal electronic devices has continued to increase, resulting in an ongoing proliferation of such devices in the marketplace. The vast majority of these devices are directed toward voice communication in the form of mobile telephones. Others are intended for data organization in the form of personal digital assistants (PDAs).

Over time, additional features have been incorporated into certain personal electronic devices. For example, digital cameras with limited feature sets are now available in some mobile telephones and PDAs. Similarly, certain PDAs have been offered which provide voice communication features similar to those of mobile telephones.

Unfortunately, there are many desirable features which have not been provided by personal electronic devices. In certain fields of business, such as construction or carpentry, there is a continuing need for measuring distances in a convenient manner. Traditionally, cumbersome dedicated equipment such as measuring tapes or laser distance meters have been employed for such tasks. Similarly, in areas where the speed of remote objects is to be measured, other dedicated equipment such as radar guns have been used.

However, given the widespread use of mobile telephones and other personal electronic devices, it has become increasingly likely that persons will have a personal electronic device available within easy reach. It would therefore be desirable to provide a personal electronic device that can determine the range and/or speed of remote objects in a convenient manner. Such a device could simplify the performance of these tasks and significantly reduce the need for other dedicated range and speed finding equipment.

BRIEF SUMMARY

In accordance with one embodiment of the present invention, a personal electronic device includes an automatic focus system adapted to focus an image of an object; and a processor in communication with the automatic focus system adapted to detect a distance of the object using the automatic focus system.

In accordance with another embodiment of the present invention, a range finder configured to determine a distance to an object relative to a personal electronic device includes a lens adapted to pass light received at the personal electronic device; an imager adapted to capture images from the light passed through the lens; an assembly adapted to move the lens relative to the imager to focus a first image of the object on the imager; a sensor adapted to detect a first position of the lens relative to the imager when the object is focused on the imager, wherein the imager is adapted to capture the first image of the object when the object is focused on the imager; and a processor adapted to calculate a first distance to the object using the detected first position of the lens In accordance with another embodiment of the present invention, a method of determining a distance to an object relative to a personal electronic device includes receiving light through an aperture of the personal electronic device; passing the light through a lens; focusing on an object; capturing an image of the object from the light passed through the lens; detecting a position of the lens when the image is captured; and calculating a distance to the object using the detected position.

In accordance with another embodiment of the present invention, a method of determining a speed of an object relative to a personal electronic device includes receiving light through an aperture of the electronic device; passing the light through a lens; moving the lens to focus the object; capturing a first image of the object from the light passed through the lens; detecting a first position of the lens when the first image is captured; calculating a first distance to the object using the detected first position; capturing a second image of the object from the light passed through the lens; calculating a time period elapsing between the capturing of the first and second images; and calculating a speed of the object using the time period.

These and other features and advantages of the present invention will be more readily apparent from the detailed description of the embodiments set forth below taken in conjunction with the accompanying drawings.

BRIEF DESCRIPTION OF THE DRAWINGS

Like reference numerals identify like elements in the accompanying drawings.

DETAILED DESCRIPTION

Figure 1:
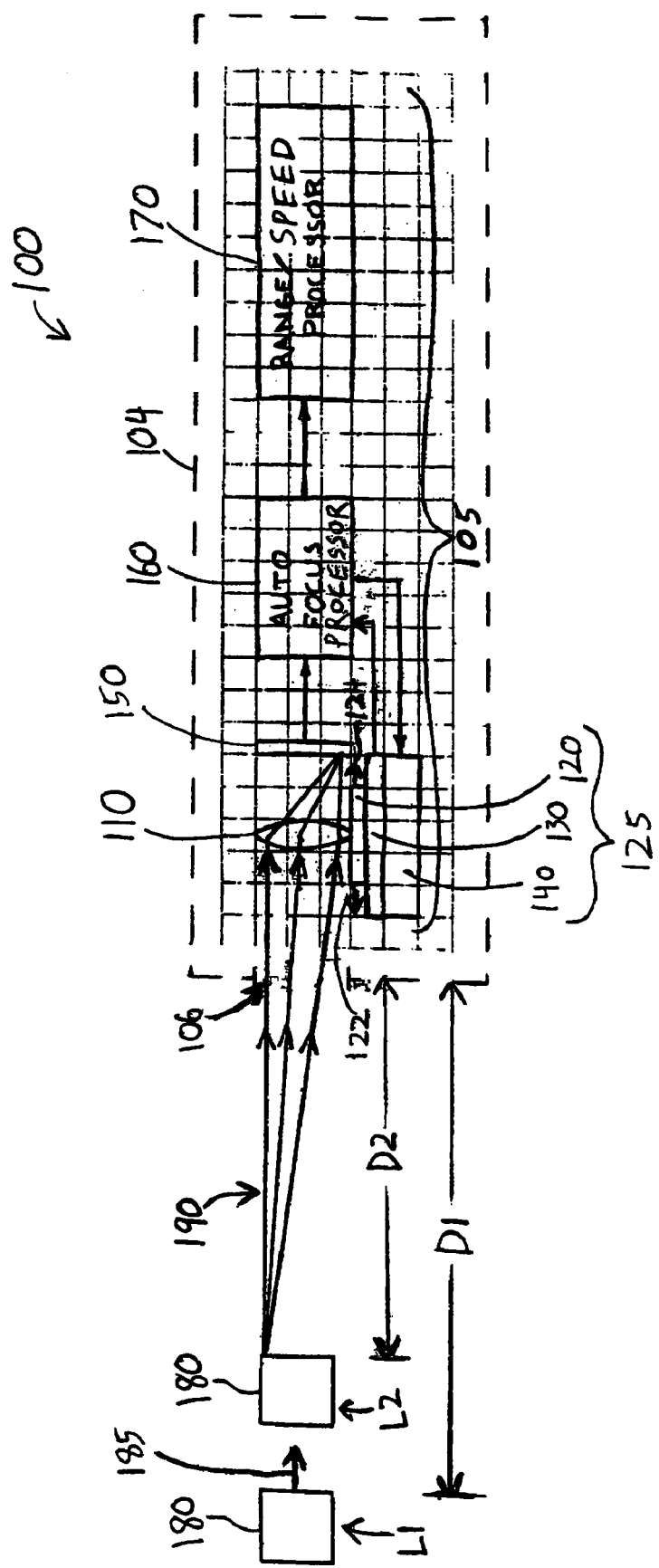
FIG. 1 illustrates a block diagram of a personal electronic device providing a range/speed finder in accordance with an embodiment of the present invention.

FIG. 1 illustrates a block diagram of a personal electronic device 100 providing a range/speed finder 105 in accordance with an embodiment of the present invention. An object 180 is situated in proximity to personal electronic device 100 at a first location L1 at a distance D1 from personal electronic device 100. As illustrated, object 180 is in motion in the direction of arrow 185. Accordingly, object 180 is also shown as being situated at a second location L2 at a distance D2 from personal electronic device 100. It will be appreciated that object 180 can transition from location L1 to location L2 after an elapsed time period of known duration.

Figure 3:
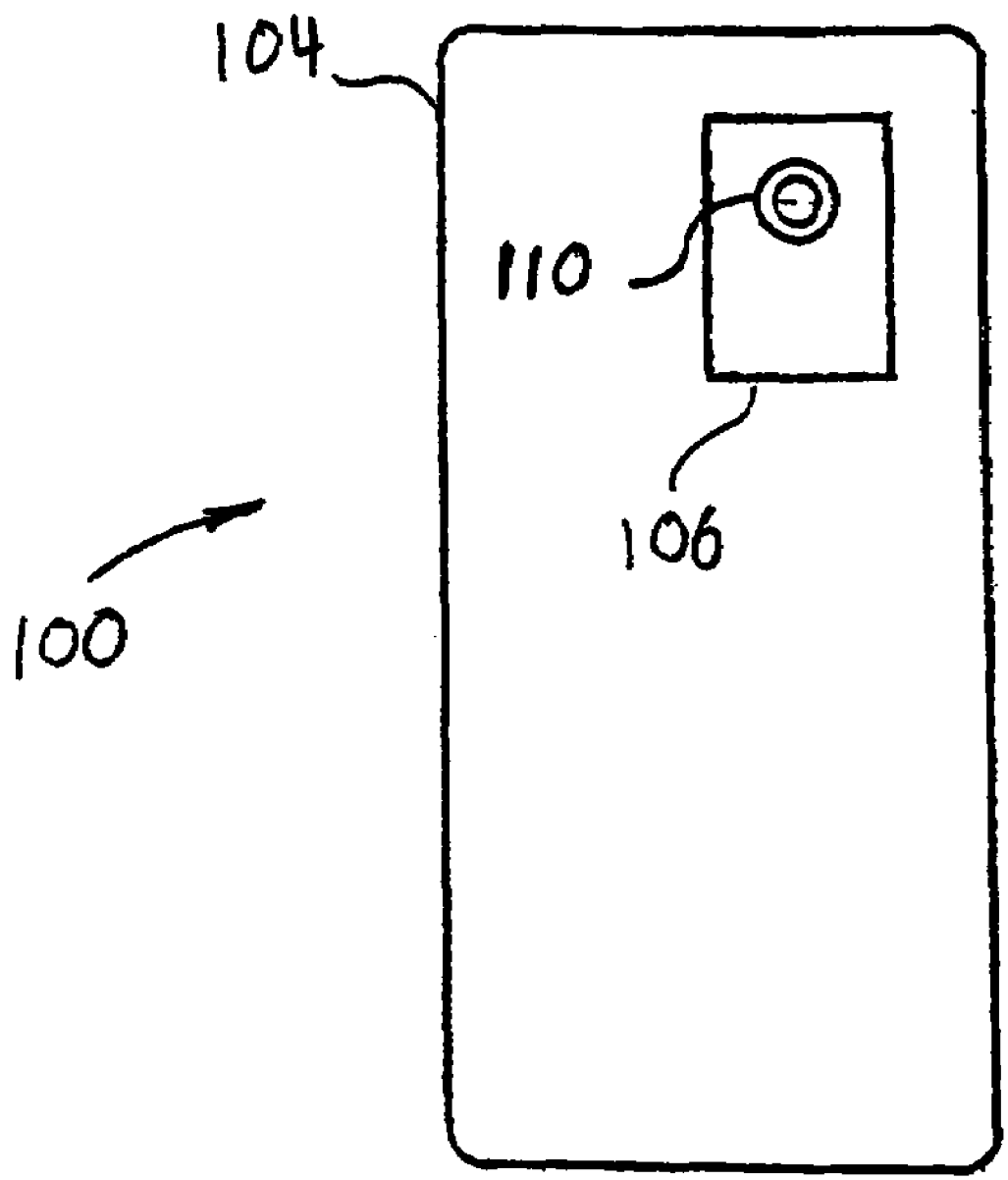
FIG. 3 illustrates a personal electronic device incorporating a range/speed finder in accordance with an embodiment of the present invention.

Personal electronic device 100 can be implemented as a portable computer, a laptop computer, a notebook computer, a pocket personal computer (pocket PC), a personal digital assistant (PDA), a mobile telephone, or any other appropriate personal electronic device in which the incorporation of range/speed finder 105 would be useful. FIG. 3 illustrates a top view of one such personal electronic device 100.

In the embodiment of FIG. 1, personal electronic device 100 is provided with an enclosure 105 having an aperture 106 through which light 190 can pass. Although light 190 has been illustrated as being reflected off object 180 at position L2, it will be appreciated that light 190 can also be reflected off object 180 at position L1 or any other position external to personal electronic device 100.

Various components of range/speed finder 105 can be implemented within enclosure 104 of personal electronic device 100. As illustrated, range/speed finder 105 can include a lens 110, an assembly 125, an imager 150, an auto focus processor 160, and a range/speed processor 170.

Lens 110 is provided for passing light 190 received at personal electronic device 100 through aperture 106. Light 190 passed through lens 110 can be received by imager 150 for capturing images of object 180 from light 190.

Imager 150 can be configured to capture digital images of object 180 from light 190 passing through lens 110. Imager 150 can be implemented using any appropriate technology for capturing digital images, such as charge-coupled device (CCD) or complimentary metal-oxide semiconductor (CMOS) technology. Images of object 180 captured by imager 150 can be provided to auto focus processor 160.

Auto focus processor 160 can provide processing for determining whether the captured images of object 180 are focused. As further described herein, auto focus processor 160 can communicate with assembly 125 to adjust the position of lens 110 in relation to imager 150 in order to focus the images on imager 150.

Assembly 125 includes a stage 120, a sensor 130, and an actuator 140. Stage 120 is a movable stage capable of being translated in a plurality of directions by actuator 140. For example, in the embodiment of FIG. 1, actuator 140 can cause stage 120 to move toward or away from imager 150 in the directions of arrows 124 and 122, respectively in response to signals provided by auto focus processor 160. Actuator 140 can be implemented in accordance with any appropriate mechanism for providing controlled movements on a scale appropriate for personal electronic device 100. In various embodiments, actuator 140 can be implemented as a Lorentz motor, a micro-electro-mechanical systems (MEMS) device, or other appropriate apparatus.

Lens 110 can be situated in a fixed position relative to stage 120. For example, lens 110 may be mounted on stage 120 in an appropriate manner such that lens 110 will move with stage 120 as it is translated by actuator 140. As a result, the focus of images captured by imager 150 can be adjusted through the operation of actuator 140 in response to signals provided by auto focus processor 160. In one embodiment, the movement of lens 110 is in a range of approximately 1 mm.

Sensor 130 can be provided for detecting one or more positions of stage 120 as it is translated in the directions of arrows 122 and 124 by actuator 140. Because lens 110 can be in a fixed position relative to stage 120, sensor 130 can therefore detect the position of lens 110 relative to imager 150 as lens 110 moves with stage 120. The detected position of lens 110 and/or stage 120 can therefore be provided to auto focus processor 160 and/or range/speed processor 170.

Range/speed processor 170 can be provided for calculating one or more distances D1 and D2 of object 180, as well as for calculating a speed of object 180 relative to personal electronic device 100. As illustrated, range/speed processor 170 is in communication with auto focus processor 160 for receiving the detected positions of lens 110 relative to imager 150. Alternatively, range/speed processor 170 can communicate (not shown) with one or more components of assembly 125 for receiving the detected positions directly from assembly 125.

It will be appreciated that the components of range/speed finder 105 can be sized to fit within enclosure 104 of personal electronic device 100. For example, in one embodiment, lens 110 and imager 150 can each be sized to be approximately 1 cm in height.

Although separate components of range/speed finder 105 have been illustrated in FIG. 1, it will be appreciated that any one or more of such components may be combined with each other. For example, in one embodiment, imager 150, auto focus processor 160, and range/speed processor 170 may be combined into a single component or integrated circuit. In other embodiments, components of range/speed finder 105 may be implemented in one or more general purpose or specific purpose processors internal or external to enclosure 104 of personal electronic device 100 with appropriate software for supporting the various features described herein.

For objects located within a range of distances (for example, between distances D1 and D2 of FIG. 1) relative to personal electronic device 100, there can be a correspondence between the distance of the object from personal electronic device 100 and the position of lens 110 at which an image of the object is focused on imager 150. For example, when object 180 is situated at location L1, various components of range/speed finder 105 can interact to move lens 110 to a first position where an image of object 180 is focused on imager 150. Similarly, when object 180 is situated at location L2, various components of range/speed finder 105 can interact to move lens 110 to a second position where an image of object 180 is again focused on imager 150.

As a result, each available position of lens 110 within the available range of motion of stage 120 can correspond to a distance at which an image of object 180 will be focused on imager 150. By detecting the position of lens 110 relative to imager 150 when object 180 is focused, the distance of object 180 from personal electronic device 100 can be determined. In one embodiment, lens 110 and stage 120 have an available range of motion of approximately 1 mm, corresponding to an available range of determinable distances in the range of approximately 10 cm to 20 m.

In one embodiment, the correspondence between the position of lens 110 and the distance of object 180 can be determined by the equation:

$$So = \left(\frac{1}{f} - \frac{1}{Si}\right)^{-1},$$

where f is the focal length of lens 110, $S_i$ is the distance between lens 110 and imager 150, and $S_o$ is the distance of object 180 from personal electronic device 100.

In view of the above, it will also be appreciated that when object 180 is in motion (for example, from location L1 to location L2 in the direction of arrow 185), the position of lens 110 at which an image of object 180 is focused on imager 150 can change as object 180 moves relative to personal electronic device 100. As discussed above, the distance of object 180 at each of locations L1 and L2 can be determined using the two different positions of lens 110 corresponding to focused images of object 180. Accordingly, the speed of object 180 in a direction perpendicular to personal electronic device 100 can be determined based on two determined distances D1 and D2, and the time elapsing between the focused images of object 180 at locations L1 and L2. In one embodiment, the speed of object 180 is the speed of lens 110 corrected by the ratio of the object 180 and lens 110 positions squared, as determined by the following equation:

$$\dot{S}o = \dot{S}i \cdot \left(\frac{So}{Si}\right)^2,$$

where Si is the distance between lens 110 and imager 150, and So is the distance of object 180 from personal electronic device 100.

Figure 4:
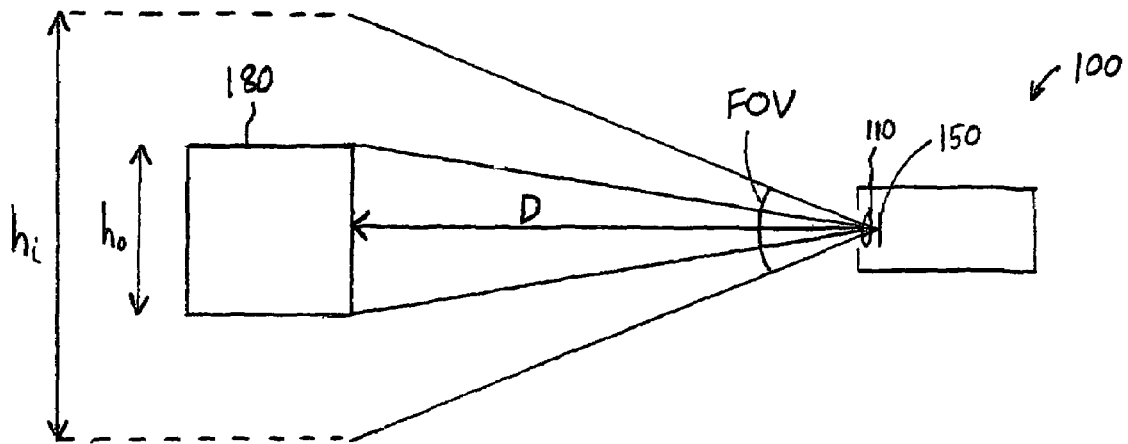
FIG. 4 illustrates a personal electronic device in proximity to an object when determining a dimension of the object in accordance with an embodiment of the present invention.

In another embodiment, the range/speed finder 105 of personal electronic device 100 can be configured to measure one or more dimensions of objects appearing in focused images captured by imager 150. For example, FIG. 4 illustrates personal electronic device 100 in proximity to object 180 in accordance with another embodiment of the present invention. It will be appreciated that for purposes of illustration, only portions of a range/speed finder of personal electronic device 100 are set forth in FIG. 4.

As identified in FIG. 4, the range/speed finder of personal electronic device 100 has a field of view in a vertical direction with an angle denoted FOV. It will be appreciated that a distance D of object 180 from personal electronic device 100 can be determined in accordance with principles discussed in this disclosure. The variable $h_o$ denotes the height of object 180. The variable $h_i$ denotes the maximum height that may be displayed by imager 150 for focused objects situated in a plane that includes object 180 and is parallel to imager 150.

Figure 5:
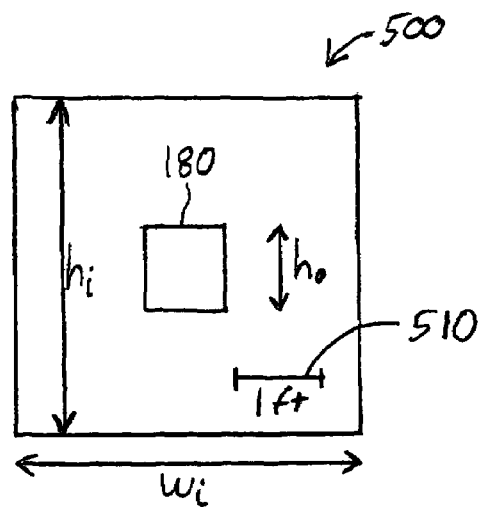
FIG. 5 illustrates an exemplary image captured for determining a dimension of an object in accordance with an embodiment of the present invention.

FIG. 5 illustrates an exemplary image 500 captured by imager 150. When object 180 is focused in image 500, the value of $h_i$ can be determined from the following equation:

$$h_i = 2D\tan\left(\frac{FOV}{2}\right).$$

Using the calculated value of $h_i$, the height $h_o$ of object 180 can be determined from the following equation:

$$h_o = \frac{n_o}{n_i}h_i,$$

where $n_o$ is the height of object 180 in pixels as it appears in image 500, and $n_i$ is the total height of image 500 in pixels.

It will be appreciated that by utilizing the principles discussed herein, various dimensions of focused objects in image 500 can be determined based on the pixels such objects occupy in image 500. Accordingly, an icon displaying a scale 510 can be provided on image 500 to aid a user in determining dimensions of objects appearing in the image 500. For example, in the embodiment illustrated in FIG. 5, scale 510 indicates that a distance between hash marks of scale 510 is equal to one foot.

Figure 6:
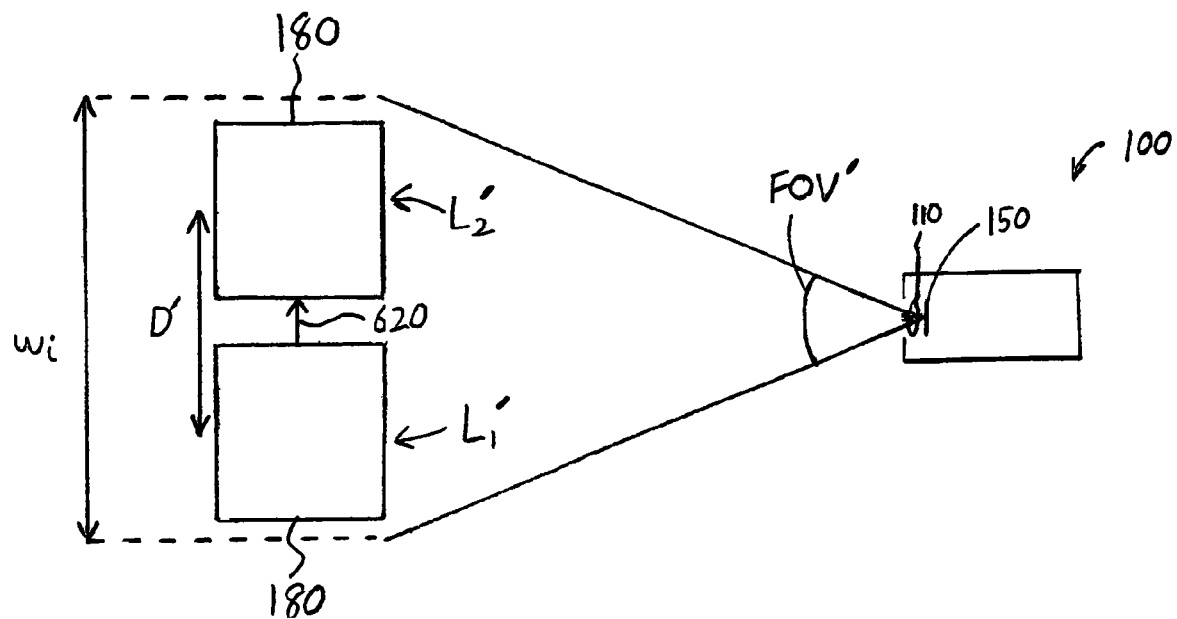
FIG. 6 illustrates a personal electronic device in proximity to an object when determining a lateral speed of the object in accordance with an embodiment of the present invention.

In another embodiment, personal electronic device 100 can be configured to calculate a lateral speed of object 180 when object 180 is moving in a plane parallel to imager 150. FIG. 6 illustrates personal electronic device 100 in proximity to object 180 when determining a lateral speed of object 180. It will be appreciated that for purposes of illustration, only portions of a range/speed finder of personal electronic device 100 are set forth in FIG. 6.

As identified in FIG. 6, the range/speed finder of personal electronic device 100 has a field of view in a horizontal direction with an angle denoted FOV'. As illustrated, object 180 is in motion in the direction of arrow 620 as it transitions from a first location L1' to a second location L2' over a distance D' during an elapsed time. The variable $w_i$ denotes the maximum width that may be displayed by imager 150 for focused objects situated in a plane that includes object 180 and is parallel to imager 150.

Figures 7A, 7B:
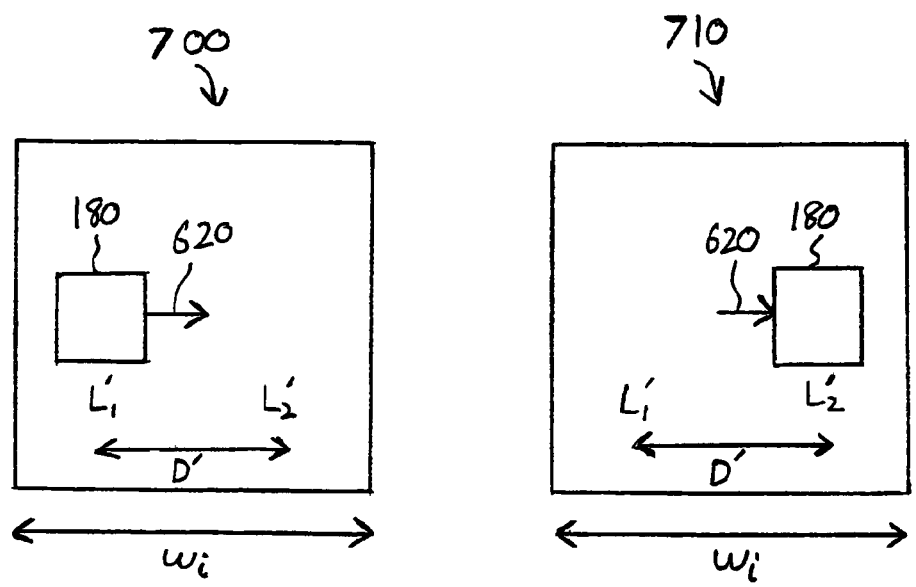
FIGS. 7A and 7B illustrate exemplary images captured by an imager for determining a lateral speed of an object in accordance with an embodiment of the present invention.

FIGS. 7A and 7B illustrate exemplary images 700 and 710, respectively, captured by imager 150. Image 700 shows object 180 at first location L1' and moving in a lateral direction indicated by arrow 620. Image 710 shows object 180 translated to second location L2' in the direction of arrow 620.

It will be appreciated that the principles discussed herein for calculating dimensions can be applied to images 700 and 710 in order to calculate distance D'. For example, when object 180 is focused in imager 150, the value of $w_i$ can be determined from the following equation:

$$w_i = 2D'\tan\left(\frac{FOV'}{2}\right).$$

Using the calculated value of $w_i$, the distance D' traversed by object 180 in the direction of arrow 620 can be can be determined from the following equation:

$$D' = \frac{n_o'}{n_i'}w_i,$$

where $n_o'$ is the number of pixels corresponding to distance D' in images 700 and 710, and $n_i'$ is the total width of each of images 700 and 710 in pixels. Using the calculated distance D', the lateral speed of object 180 can then be determined by dividing the distance D' by the time elapsing between the capturing of images 700 and 710.

Figure 2A:
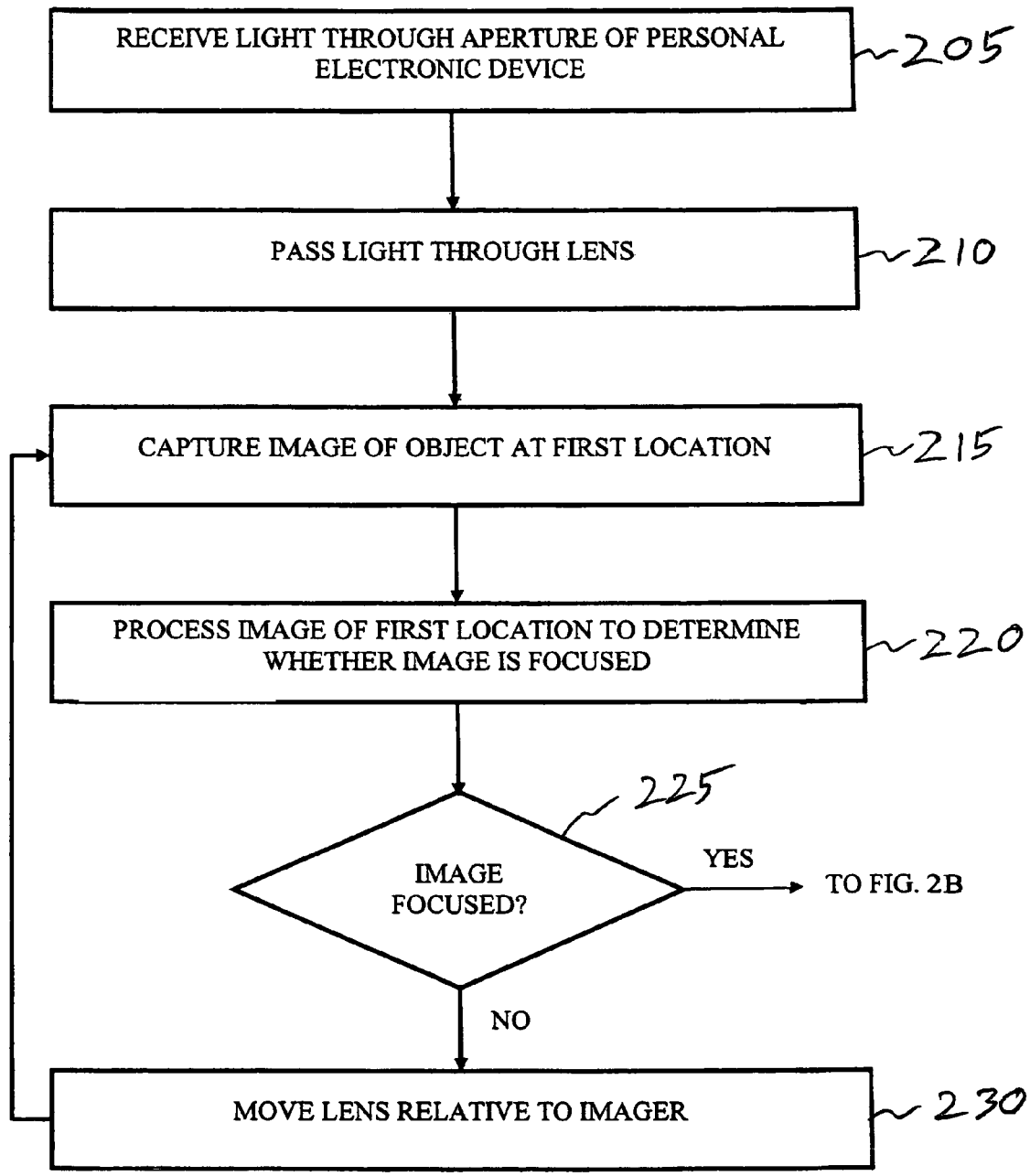
FIGS. 2A-C illustrate a flowchart describing a process for determining a distance to an object, dimensions of the object, and a speed of the object in accordance with an embodiment of the present invention.

The operation of range/speed finder 105 will now be described with reference to FIGS. 2A-C which illustrate a flowchart describing a process for determining a distance to object 180, dimension of object 180, and speed of object 180 in accordance with an embodiment of the present invention.

When it is desired to determine a distance, dimension, and/or speed of object 180 at location L1 or L1', light 190 reflected by object 180 can be received through aperture 106 of personal electronic device 100 (step 205). It will be appreciated that aperture 106 may be opened prior to step 205 in embodiments where aperture 106 is closed by a door, shutter, or other mechanism (not shown).

Light 190 received through aperture 106 can be received by lens 110 and passed to imager 150 (step 210). Imager 150 then captures a first image of object 180 and provides the captured image to auto focus processor 160 (step 215). Auto focus processor 160 processes the image to determine whether the image is focused (step 220). It will be appreciated that the processing of step 220 (as well as step 250 further described herein) can be performed in accordance with any desired automatic focusing techniques utilized in the field of digital imagery.

If auto focus processor 160 determines that the image captured in step 215 is not focused (step 225), then auto focus processor 160 signals actuator 140 to move stage 120 (and, accordingly lens 110) relative to imager 150 in order to improve the focusing of object 180 on imager 150 (step 230). For example, step 230 may include moving stage 120 in direction 124 or 122 toward or away from imager 150, respectively. Thereafter, steps 215, 220, 225, and/or 230 can be repeated as may be required until lens 110 is positioned such that a focused image of object 180 is captured by imager 150.

Figure 2B:
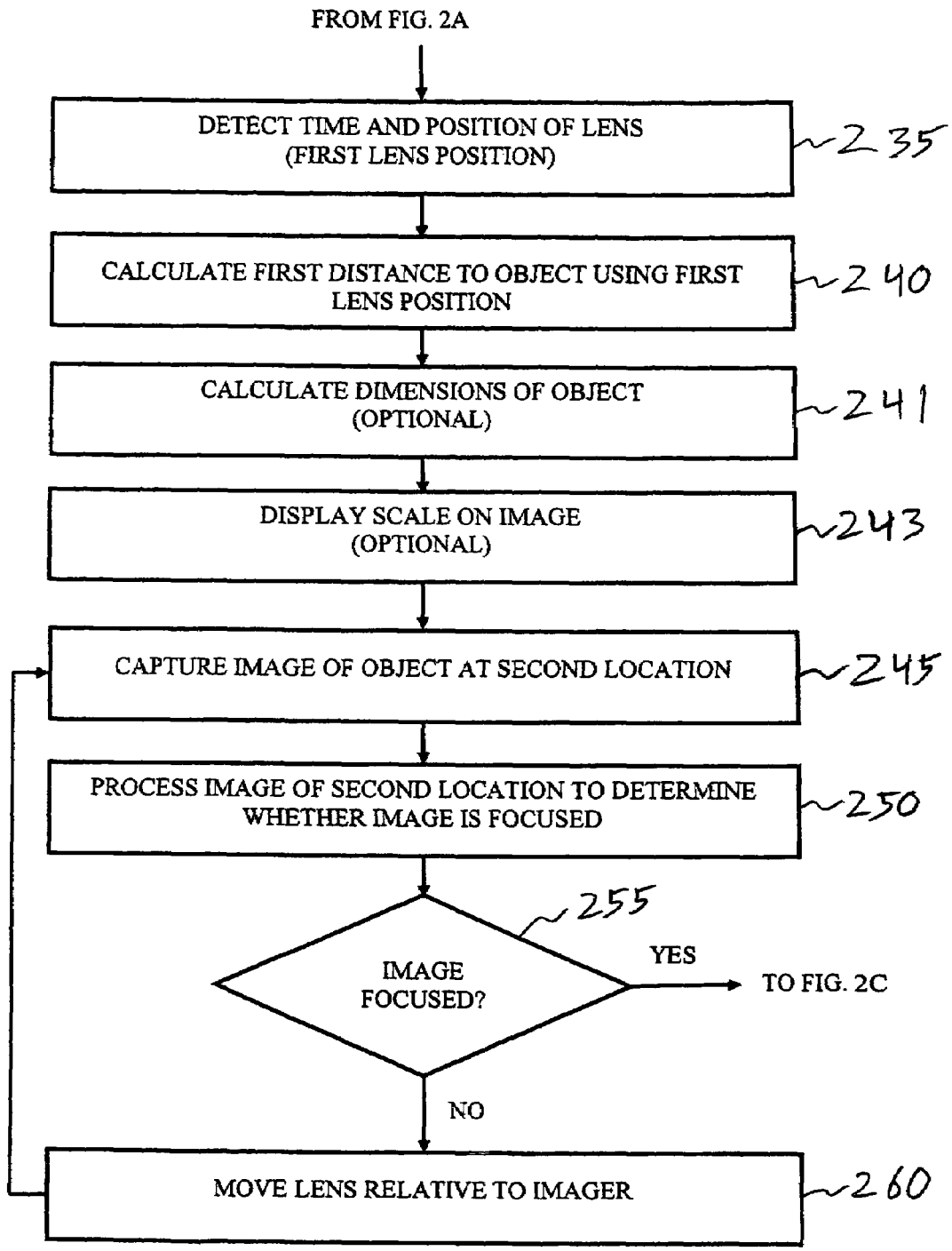

When the image captured in step 215 is focused (step 225), the process proceeds to FIG. 2B. At step 235, sensor 130 detects a first lens position corresponding to the position of lens 110 at which the image of object 180 at location L1 or L1' is focused. The first lens position can be provided by sensor 130 to range/speed processor 170 through auto focus processor 160 as illustrated in FIG. 1. Alternatively, the first lens position can be provided by sensor 130 directly to range/speed processor 170 (not shown). If it is desired to further calculate the speed of object 180 relative to personal electronic device 100, then a first time value can further be detected at step 235.

As previously discussed, the first lens position can correspond to a particular distance D1 at which images will be focused on imager 150. Accordingly, range/speed processor 170 can calculate a first distance to object 180 using the first lens position (step 240).

At step 241, one or more dimensions of object 180 at location L1 or L1' can optionally be calculated in accordance with principles discussed herein. At step 243, a scale can be optionally displayed on the first captured image in accordance with principles also discussed herein.

If it is desired to further calculate the speed of object 180 relative to personal electronic device 100, then the process continues to step 245. At step 245, imager 150 captures a second image of object 180 at location L2 or L2' and provides the captured image to auto focus processor 160. Optionally, the performance of step 245 can be delayed by a desired time period in order to allow object 180 to move to second location L2 or L2'. Auto focus processor 160 processes the second image to determine whether the image is focused (step 250).

If auto focus processor 160 determines that the image captured in step 245 is not focused (step 255), then auto focus processor 160 signals actuator 140 to move stage 120 (and, accordingly lens 110) relative to imager 150 in order to improve the focusing of object 180 on imager 150 (step 260). Thereafter, steps 245, 250, 255, and/or 260 can be repeated as may be required until lens 110 is positioned such that a focused image of object 180 is captured by imager 150.

Figure 2C:
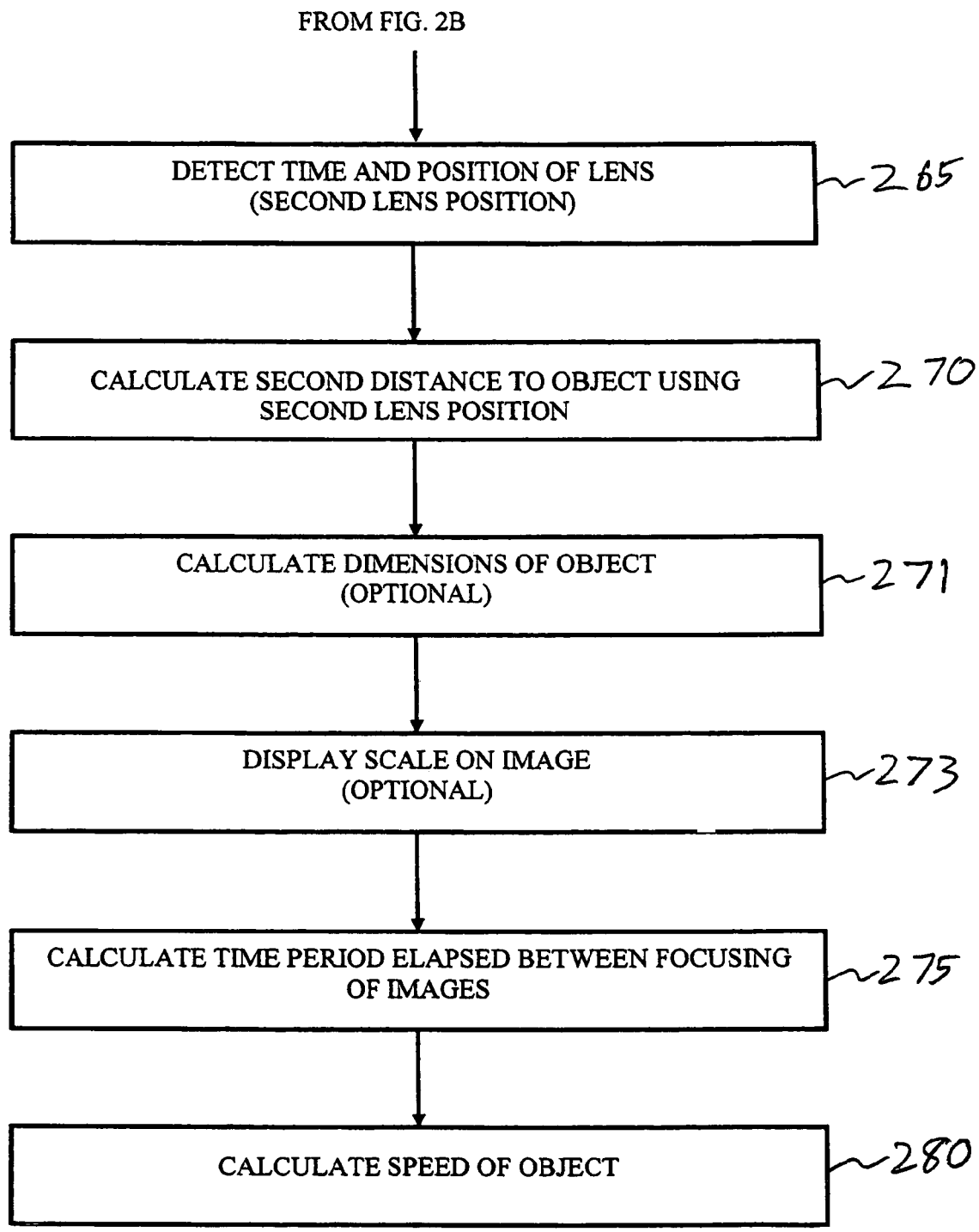

When the image captured in step 245 is focused (step 255), the process proceeds to FIG. 2C. At step 265, sensor 130 detects a second time value as well as a second lens position corresponding to the position of lens 110 at which the image of object 180 at location L2 or L2' is focused. The second lens position can be provided by sensor 130 to range/speed processor 170 in one of the various manners previously described herein. Using the second lens position, range/speed processor 170 can then calculate a second distance to object 180 at location L2 or L2' (step 270).

At step 271, one or more dimensions of object 180 at location L2 or L2' can optionally be calculated in accordance with principles discussed herein. At step 273, a scale can be optionally displayed on the second captured image in accordance with principles also discussed herein.

At step 275, range/speed processor 170 can calculate a time period elapsing between the two positions (step 275). It will be appreciated that the time period can be determined in accordance with various appropriate methods For example, in one embodiment, the time period corresponds to the time elapsing between the first and second time values detected in steps 235 and 265, respectively. In another embodiment, the time period corresponds to the optional delay in the performance of step 245 previously described herein. In another embodiment, range/speed processor 170 can calculate the time period based on the elapsed time between its receipt of the first and second detected lens positions.

At step 280, range/speed processor 170 proceeds to calculate the speed of object 180 relative to personal electronic device 100. It will be appreciated that the speed calculation of step 280 can utilize the principles discussed herein for calculating the speed of object 180 in directions perpendicular to (i.e. in the direction of arrow 185) and/or lateral to (i.e. in the direction of arrow 620) personal electronic device 100. It will be appreciated that the distances and speed calculated by range/speed processor 170 can optionally be displayed to a user and/or otherwise utilized by personal electronic device 100 as may be desired.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can stored on one or more computer readable mediums. It is also contemplated that any software identified herein can be implemented using one or more general purpose or specific purpose computers and/or computer systems, networked and/or otherwise.

Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

What is claimed is:

1. A personal electronic device, comprising:
   an automatic focus system adapted to focus an image of an object through a lens of the device and onto an imager thereof; and,
   a processor in communication with the automatic focus system and adapted to compute a distance of the object from the device as a function of a focal length of the lens and a distance between the lens and the imager.

2. The personal electronic device of claim 1, wherein the processor is adapted to detect a speed of the object using the automatic focus system.

3. The personal electronic device of claim 1, wherein the processor is adapted to measure a dimension of the object using the automatic focus system.

4. The personal electronic device of claim 1, wherein the personal electronic device is selected from the group consisting of:
   a portable computer;

a laptop computer;
a notebook computer;
a pocket personal computer (pocket PC);
a personal digital assistant (PDA); and,
a mobile telephone.

5. A range finder configured to determine a distance to an object relative to a personal electronic device, the range finder comprising:
　　a lens having a focal length and adapted to pass light received at the personal electronic device;
　　an imager adapted to capture images from the light passed through the lens;
　　an assembly adapted to move the lens relative to the linger to focus a first image of the object an the imager;
　　a sensor adapted to detect a first position of the lens relative to the imager when the object is focused on the imager, wherein the imager is adapted to capture the first image of the object when the object is focused on the imager, and,
　　a processor adapted to calculate a first distance to the object from the device as a function of the focal length of the lens and the distance between the lens and the imager.

6. The range finder of claim 5, wherein the processor is adapted to calculate a dimension of the object using the first distance, a field of view associated with the range finder, and the first image.

7. The range finder of claim 5, wherein the range finder is adapted to measure a speed of the object relative to the personal electronic device, wherein:
　　the imager is adapted to capture a second image of the object when the object is focused on the imager; and,
　　the processor is adapted to calculate:
　　　　a distance traveled by the object using the first distance, a field of view associated with the range finder, the first image, and the second image; and,
　　　　a speed of the object relative to the personal electronic device using the calculated distance traveled by the object and a time period elapsing between the capture of the first and second images.

8. The range finder of claim 5, wherein the range finder is adapted to measure a speed of the object relative to the personal electronic device, wherein:
　　the sensor is adapted to detect a second position of the lens relative to the imager when the object is focused on the imager;
　　the imager is adapted to capture a second image of the object when the object is focused on the imager; and,
　　the processor is adapted to calculate a second distance to the object using the detected second position of the lens, and adapted to calculate the speed of the object relative to the personal electronic device using the first distance, second distance, and a time period elapsing between the focusing of the first and second images.

9. The range finder of claim 5, wherein the assembly comprises:
　　a stage, wherein the lens is in a fixed position relative to the stage; and,
　　an actuator adapted to translate the stage relative to the imager.

10. The range finder of claim 9, wherein the actuator is a Lorentz motor.

11. The range finder of claim 9, wherein the actuator is a micro-electro-mechanical systems (MEMS) device.

12. The range finder of claim 5, wherein the range finder is embedded in the personal electronic device.

13. The range finder of claim 5, wherein the personal electronic device is selected from the group consisting of:
　　a portable computer;
　　a laptop computer;
　　a notebook computer;
　　a pocket personal computer (pocket PC);
　　a personal digital assistant (PDA); and,
　　a mobile telephone.

14. A method of determining a distance to an object from a personal electronic device, the method comprising:
　　receiving light from the object through an aperture of the personal electronic device;
　　passing the light through a lens of the device, the lens having a focal length;
　　focusing the light from the object passed through the lens onto an imager of the device;
　　capturing an image of the object with the imager;
　　detecting a distance between the lens and the imager when the image is captured; and,
　　calculating the distance to the object from the device as a function of the focal length of the lens and the detected distance between the lens and the imager.

15. The method of claim 14, further comprising calculating a dimension of the object using the distance, a field of view, and the image.

16. The method of claim 14, further comprising:
　　processing the image to determine whether the image is focused on an imager; and,
　　if the image is not focused on the imager;
　　　　moving the lens relative to the imager, and,
　　　　repeating the capturing, processing, and moving until the image is focused on the imager.

17. A method of determining a speed of an object relative to a personal electronic device, the method comprising:
　　receiving light through an aperture of the electronic device;
　　passing the light through a lens;
　　moving the lens to focus the object;
　　capturing a first image of the object from the light passed through the lens;
　　detecting a first position of the lens when the first image is captured;
　　calculating a first distance to the object using the detected first position;
　　capturing a second image of the object from the light passed through the lens;
　　calculating a time period elapsing between the capturing of the first and second images; and,
　　calculating a speed of the object using the time period.

18. The method of claim 17, further comprising calculating a distance traveled by the object using the first distance, a field of view, the first image, and the second image, wherein the calculating a speed further uses the calculated distance traveled by the object.

19. The method of claim 17, further comprising:
　　moving the lens again to focus the object;
　　detecting a second position of the lens when the second image is captured; and,
　　calculating a second distance to the object using the second detected position, wherein the calculating a speed further uses the first distance and second distance.

20. The method of claim 17, wherein the first and second lens positions correspond to positions of the lens relative to an imager.

* * * * *